United States Patent Office 3,574,612
Patented Apr. 13, 1971

3,574,612
NICKEL-CHROMIUM ALLOY
Roy F. Maness, Richland, Wash., assignor to the United States of America as represented by the United States Atomic Energy Commission
No Drawing. Filed Feb. 3, 1969, Ser. No. 796,176
Int. Cl. C22c 19/00
U.S. Cl. 75—171                                2 Claims

ABSTRACT OF THE DISCLOSURE

A nickel alloy containing 30 to 35 weight percent chromium and 3.5 to 3.9 weight percent silicon with small amounts of carbon, titanium and manganese is highly corrosion resistant to hot, liquid and vapor phase nitric acid solutions, containing iron (III), chromium (VI) and fluoride ions.

CONTRACTURAL ORIGIN OF THE INVENTION

The invention described herein was made in the course of, or under, a contract with the United States Atomic Energy Commission.

BACKGROUND OF THE INVENTION

This invention relates to a corrosion resistant alloy and in particular to a nickel-chromium alloy resistant to hot nitric acid solutions containing iron (III), chromium (VI) and fluoride ions.

Reprocessing of irradiated nuclear fuels may require extremely corrosive liquids in order to dissolve both the cladding material and the fuel. Waste solutions produced from reprocessing are often concentrated by evaporation prior to storage and/or disposal, and these waste solutions as well as the reagents used for fuel assembly dissolution are so corrosive that the service life of ordinary alloys is relatively short. The so-called Purex process uses nitric acid in the separation of uranium, plutonium and fission products and produces a waste stream, hereinafter IWW, with the following approximate composition:

6M $HNO_3$, 0.4M $NaNO_3$, 0.4M $H_2SO_4$, 0.3M $Fe_2(SO_4)_3$, 0.01M $Na_3PO_4$, 0.01M $CrO_3$, 0.01M $Hg(NO_3)_2$

Due to changes in the type of cladding material as well as operating conditions in the Purex process, the IWW now contains fluoride ion. The fluoride ion coacts with the iron (III) and chromium (VI) ions already present in the IWW to promote acid corrosion of the process equipment. Because the fluorides are volatile they affect the corrosiveness of not only the liquid phase but also the vapor phase of the IWW. It is, therefore, the principal object of this invention to provide an alloy resistant to acid corrosion by IWW solutions containing fluoride ion.

SUMMARY OF THE INVENTION

This invention comprises a nickel alloy containing about 30 to 35 percent by weight of chromium, where the nickel and chromium combined total about 94 to 96.5 percent by weight, with about 3.2 to 4.2 percent by weight of silicon, an effective amount up to about 3 percent by weight of titanium and manganese and less than 0.02 percent by weight of carbon.

DETAILED DESCRIPTION OF THE PREFERRED EMBODIMENT

A number of alloys were tested to measure their resistance to corrosion by a variety of nitric acid solutions. Some tests were also conducted with 304L stainless steel to provide a standard for comparison. Because the welds in reprocessing equipment are often the weakest part of the equipment, some of the tested samples were heated to simulate the heating conditions during welding. These samples are referred to in the data as "sensitized" and were maintained at a temperature of 1250° F. for one hour and then water quenched. Because fluoride ion appears in the vapor phase of the IWW and the vapor phase may be more corrosive than the liquid phase, tests were conducted to determine corrosion due to both liquid and vapor phases. In the tests and tables contained herein, alloy number 1 is the subject matter of this invention. The results of the tests are reported in the following tables:

TABLE I.—NOMINAL COMPOSITION OF EXPERIMENTAL ALLOYS

| | Weight percent | | | | | | | |
|---|---|---|---|---|---|---|---|---|
| | Fe | Ni | Cr | Mo | Cu | Ti | Si | Mn | C |
| Alloy No. | | | | | | | | | |
| 1 | | 61 | 34 | | | | 1.0 | 3.7 | 0.6 | 0.02 |
| 2 | | 61 | 30 | 4.0 | | | 1.0 | 3.7 | 0.6 | 0.02 |
| 3 | 55 | 20 | 18 | 3.0 | | | | 3.7 | 0.6 | 0.02 |
| 4 | 13 | 50 | 25 | 6.0 | 1.0 | 1.0 | 3.7 | 0.6 | 0.02 |
| 5 | 13 | 50 | 25 | 6.0 | | 1.0 | 3.7 | 0.6 | 0.02 |

TABLE II.—CORROSION RATES IN NITRIC ACID SOLUTIONS

| | A. Five 48-hour exposures [1] | | | | | | B. Five 48-hour exposures [2] | | | | | | C. Five 48-hour exposures [3] | | | | | |
|---|---|---|---|---|---|---|---|---|---|---|---|---|---|---|---|---|---|---|
| | Corrosion rate, mils/month period | | | | | | Corrosion rate, mils/month period | | | | | | Corrosion rate, mils/month period | | | | | |
| Alloy No. | 1 | 2 | 3 | 4 | 5 | Average | 1 | 2 | 3 | 4 | 5 | Average | 1 | 2 | 3 | 4 | 5 | Average |
| 1 | 0.41 | 0.37 | 0.34 | 0.25 | 0.38 | 0.35 | 0.71 | 0.50 | 0.39 | 0.30 | 0.32 | 0.44 | 0.22 | 0.25 | 0.18 | 0.17 | 0.14 | 0.19 |
| 2 | 1.01 | 0.85 | 0.65 | 0.95 | 0.84 | 0.86 | 1.52 | 1.18 | 0.93 | 0.93 | 0.98 | 1.10 | 0.98 | 0.70 | 0.70 | 0.67 | 0.67 | 0.74 |
| 3 | 3.42 | 2.74 | 2.70 | 3.21 | 3.20 | 3.05 | 3.34 | 4.33 | 3.56 | 5.39 | 5.90 | 4.50 | 2.23 | 2.09 | 2.84 | 3.67 | 4.43 | 3.05 |
| 4 | 1.97 | 1.78 | 1.84 | 2.09 | 2.13 | 1.96 | 2.05 | 2.68 | 3.25 | 4.59 | 5.41 | 3.59 | 2.08 | 2.19 | 2.74 | 3.87 | 3.40 | 2.86 |
| 5 | 2.61 | 2.39 | 2.52 | 3.04 | 3.15 | 2.74 | 1.77 | 1.69 | 1.87 | 2.54 | 2.81 | 2.14 | 1.60 | 1.50 | 1.53 | 1.86 | 1.94 | 1.69 |

[1] To boiling 65 w/o nitric acid. Corrosion Specimens in annealed condition.
[2] To boiling 65 w/o nitric acid. Corrosion specimens in sensitized condition.
[3] To boiling 50 w/o nitric acid. Corrosion specimens in sensitized condition.

TABLE III.—CORROSION RATES IN SILUMATED PUREX IWW SOLUTION

[Conditions: Five 48-hour exposures to boiling solutions. Sensitized corrosion specimens]

| | Corrosion rate, mils/month period | | | | | |
|---|---|---|---|---|---|---|
| Alloy No. | 1 | 2 | 3 | 4 | 5 | Average |
| 1 | 1.42 | 1.35 | 1.63 | 1.77 | 2.30 | 1.69 |
| 2 | 0.59 | 0.51 | 0.56 | 0.69 | 1.01 | 0.67 |
| 3 | 0.70 | 0.68 | 1.22 | 1.35 | 1.82 | 1.15 |
| 4 | 2.09 | 2.39 | 3.00 | 4.12 | 5.39 | 3.40 |
| 5 | 0.93 | 1.62 | 2.18 | 2.84 | 2.06 | 1.03 |

TABLE IV.—CORROSION RATES IN PUREX IWW SOLUTION CONTAINING 0.1M FLUORIDE

[Conditions: Five 48-hour exposures to boiling solutions contained in Teflon. Sensitized corrosion specimens in both liquid and vapor phases]

| Alloy No. | Liquid phase corrosion rate, mils/month period | | | | | | Vapor phase corrosion rate, mils/month period | | | | | |
|---|---|---|---|---|---|---|---|---|---|---|---|---|
| | 1 | 2 | 3 | 4 | 5 | Average | 1 | 2 | 3 | 4 | 5 | Average |
| 1 | 0.41 | 0.34 | 0.34 | 0.39 | 0.33 | 0.36 | 0.54 | 0.46 | 0.35 | 0.59 | 0.59 | 0.51 |
| 2 | 2.17 | 2.68 | 4.42 | 6.02 | 8.40 | 4.74 | 1.48 | 0.88 | 2.47 | 4.39 | 5.61 | 2.97 |
| 3 | 5.57 | 8.40 | 12.4 | 14.3 | 15.3 | 11.2 | 3.28 | 8.65 | 6.60 | 10.4 | 2.67 | 6.31 |
| 4 | 4.83 | 11.3 | 21.3 | 24.5 | 26.2 | 17.6 | 3.72 | 3.86 | 9.03 | 22.3 | 16.5 | 11.1 |
| 5 | 5.32 | 2.63 | 13.2 | 18.8 | 20.4 | 17.1 | 6.18 | 11.3 | 3.44 | 8.82 | 10.4 | 8.03 |

TABLE V.—CORROSION RATES IN PUREX IWW SOLUTION CONTAINING 0.1M FLUORIDE AND 0.1 M Al(NO$_3$)$_3$

[Conditions: Five 48-hour exposures to boiling solutions contained in Teflon. Sensitized corrosion specimens exposed to both liquid and vapor phases]

| Alloy No. | Liquid phase corrosion rate, mils/month period | | | | | | Vapor phase corrosion rate, mils/month period | | | | | |
|---|---|---|---|---|---|---|---|---|---|---|---|---|
| | 1 | 2 | 3 | 4 | 5 | Average | 1 | 2 | 3 | 4 | 5 | Average |
| 1 | 0.52 | 0.43 | 0.45 | 0.51 | 0.45 | 0.47 | 0.12 | 0.19 | 0.18 | 0.22 | 0.14 | 0.17 |
| 2 | 1.21 | 1.14 | 1.39 | 2.30 | 3.02 | 1.81 | 1.43 | 0.47 | 0.19 | 1.79 | 0.55 | 0.80 |
| 3 | 2.21 | 2.12 | 3.06 | 6.52 | 7.43 | 4.27 | 1.30 | 0.64 | 1.08 | 6.56 | 4.54 | 2.82 |
| 4 | 2.03 | 2.08 | 3.39 | 3.07 | 10.4 | 4.18 | 3.13 | 2.93 | 3.85 | 11.0 | 6.91 | 5.36 |
| 5 | 2.89 | 2.93 | 3.96 | 9.47 | 11.0 | 6.04 | 1.25 | 1.36 | 2.94 | 3.01 | 3.56 | 2.42 |

TABLE VI.—CORROSION RATES IN FLUORIDE-BEARING PUREX CWW SOLUTION ALLOY NO. 1

[Conditions: Five 48-hour exposures to boiling solutions contained in Teflon. Weldments exposed to liquid phase. Sensitized coupons exposed to vapor phase]

| Solution | Liquid phase corrosion rate, mils/month period | | | | | | Vapor phase corrosion rate, mils/month period | | | | | |
|---|---|---|---|---|---|---|---|---|---|---|---|---|
| | 1 | 2 | 3 | 4 | 5 | Avg. | 1 | 2 | 3 | 4 | 5 | Avg. |
| IWW-0.50 NH$_4$F | 5.88 | 6.43 | 1.79 | 5.87 | 6.89 | [1]5.37 | 3.53 | 2.81 | 2.01 | 3.09 | 9.18 | 4.12 |
| IWW0.25M NH$_4$F | 2.46 | 2.38 | 1.94 | 2.45 | 2.24 | 2.29 | 0.73 | 0.88 | 0.66 | 0.84 | 1.35 | 0.89 |
| IWW-0.50M NH$_4$F-0.25M Al(NO$_3$)$_3$ | 1.58 | 2.19 | 1.08 | 1.24 | 2.03 | 1.62 | 1.28 | 3.23 | 1.30 | 0.98 | 0.69 | 1.50 |

[1] Preferential attack of weld metal.

TABLE VII.—CORROSION RATES IN FLUORIDE-BEARING PUREX IWW SOLUTION SENSITIZED 304L

[Conditions: 48-hour exposures to boiling solutions contained in Teflon]

| Solution | Liquid phase corrosion rate, mils/month period | | | | Vapor phase corrosion rate, mils/month period | | | |
|---|---|---|---|---|---|---|---|---|
| | 1 | 2 | 3 | Average | 1 | 2 | 3 | Average |
| IWW-0.10M NH$_4$F | 4.05 | 2.44 | 2.68 | 3.06 | 16.7 | 11.9 | 5.80 | 11.5 |
| IWW-0.10M NH$_4$F-0.1M Al(NO$_3$)$_3$ | 3.48 | 2.95 | 3.35 | 3.26 | 2.40 | 2.67 | 2.45 | 2.51 |
| IWW-0.25M NH$_4$F | 9.99 | 33.4 | 25.4 | 22.9 | 19.9 | 29.3 | 24.3 | 24.5 |
| IWW-0.50M NH$_4$F | 7.42 | 113 | 100 | 95.7 | 93.0 | 71.0 | 62.9 | 76.0 |
| IWW-0.50M NH$_4$F-0.25M Al(NO$_3$)$_3$ | 5.64 | 7.62 | 10.2 | 7.82 | 26.6 | 5.14 | 28.2 | 20.0 |

TABLE VIII.—CORROSION RATES OF ALLOY NO. 1 WELDMENTS

[Conditions: Five 48-hour exposures to boiling solutions unless otherwise noted. Fluoride-bearing solutions contained in Teflon]

| Solution | 1 | 2 | 3 | 4 | 5 | Average |
|---|---|---|---|---|---|---|
| 65 w/o HNO$_3$ | 1.41 | 0.80 | 0.73 | 0.53 | 0.81 | 0.86 |
| IWW | 2.75 | 1.95 | 1.95 | 2.01 | 1.99 | 2.13 |
| IWW-0.10M NH$_4$F | 1.19 | 1.47 | 0.86 | 0.93 | 0.91 | 1.07 |
| IWW-0.10M NH$_4$F-0.1M Al(NO$_3$)$_3$ | 1.14 | 1.49 | 0.86 | 0.77 | 0.86 | 1.02 |
| 6M NH$_4$F-0.5M NH$_4$NO$_3$ [1] | 24.9 | 16.8 | 16.1 | 11.3 | 0.17 | 13.9 |
| 6M NH$_4$F-0.5M NH$_4$NO$_3$-0.01M Cu(NO$_3$)$_2$ | 1.05 | 0.35 | 0.39 | 0.41 | 0.51 | 0.54 |
| 12.5M HNO$_3$-0.025M NH$_4$F-0.1M Al(NO$_3$)$_3$ | 2.15 | 1.82 | 1.41 | 1.06 | 1.02 | 1.49 |

[1] Five 24-hour exposures.

With reference to Table II, an average corrosion rate of about 2 mils per month or less is acceptable for sensitized samples contacted with a 65 w/o nitric acid solution. Table II shows that only alloys 1 and 2 (see Table I for their nominal compositions) are acceptable.

With reference to Table III, a simulated Purex IWW solution as hereinbefore defined was used throughout. Corrosion was general over the sample tested with little or no intergranular attack; all alloys except number 4 exhiibted good corrosion resistance.

With reference to Tables IV, V and VI, various additions to the IWW were made and their effect on the alloys recorded. Alloy number 1 gave the far superior results when only fluoride ion was present as shown in Table IV, but when Al$^{+3}$ ion was present, see Table V, then alloy number 2 also gave acceptable results. Fluoride concentrations to 0.25 M did not result in preferential attack on the welds, but a fluoride concentration of 0.5 M did, see Table VI. A comparison of Tables II, IV and V shows that addition of 0.1 M fluoride to the IWW actually inhibits corrosion of the number 1 alloy and, to this extent, is beneficial rather than harmful. Table VI shows that the presence of Al$^{+3}$ ion reduces the corrosion rate of solutions 0.5 M in fluoride ion to acceptable values.

With reference to Tables VII and VIII, both sensitized 304L stainless steel and weldments of alloy number 1 were subjected to corrosive action of IWW with various fluoride additions. The superior corrosion resistance of alloy number 1 is clearly shown by comparison of the ables. Additions of Cu$^{+2}$ ion, as shown in Table VIII, as well as addition of $Al^{+3}$ ion permits high fluoride concentrations to be used with acceptable corrosion rates. It should be noted that rarely in alloy experiments one particular specimen will behave differently than other specimens of the same alloy. The fifth specimen in the 6 M $NH_4F$–0.5 M $NH_4NO_3$ experiment in Table VIII remained passive to the solution to a much greater degree than did the other four specimens.

The number 1 alloy has good forging and rolling characteristics as a ⅛ inch sheet was produced from a 15-pound ingot. Ductile welds were produced using the tungsten-inert gas technique and strips from the base metal as filler metal. Both titanium and manganese are present to give the above-mentioned rolling and forging characteristics and do not, as far as known, materially improve resistance to corrosion. See also, the exact weight percents of nickel and chromium are not critical within about 5 to 6 weight percent of the value specified in Table I for alloy number 1. The amount of silicon is considered critical within ⅕ to ½ of a weight percent of the value specified in Table I for alloy number 1.

The experiments cited herein are meant to be illustrative of the invention but not to define it. The invention is defined in the following claims.

The embodiments of the invention in which an exclusive property or privilege is claimed are defined as follows:

1. An alloy, for use in process equipment subjected to corrosion by solutions containing nitric acid and fluoride ions, consisting essentially of:
   30 to 35 percent by weight of chromium;
   59.08 to 66.5 percent by weight of nickel;
   0 to 0.02 percent by weight of carbon;
   an effective amount up to 0.8 percent by weight of manganese for workability;
   an effective amount up to 1.2 percent by weight of titanium for workability; and
   3.5 to 3.9 percent by weight of silicon.

2. The alloy of claim 1 wherein the chromium concentration is 34 percent by weight, the nickel concentration is 61 percent by weight, the silicon concentration is 3.6 percent by weight, the titanium concentration is 0.90 percent by weight, the manganese concentration is 0.48 percent by weight and the carbon concentration is 0.02 percent by weight.

References Cited

UNITED STATES PATENTS

| | | | |
|---|---|---|---|
| 2,190,840 | 2/1940 | Kay | 75—171 |
| 2,992,918 | 7/1961 | Edwin et al. | 75—171 |

RICHARD O. DEAN, Primary Examiner